United States Patent
Wang

(10) Patent No.: US 10,721,988 B2
(45) Date of Patent: Jul. 28, 2020

(54) WOVEN HAT AND METHOD FOR MANUFACTURING WOVEN HAT BY USING ULTRASONIC SEWING TECHNOLOGY WITHOUT SEWING THREAD

(71) Applicant: Qingdao Qianfeng Capart Int'l Corp., Qingdao (CN)

(72) Inventor: Ai'mei Wang, Qingdao (CN)

(73) Assignee: Qingdao Qianfeng Capart Int'l Corp, Beijing (CN)

( * ) Notice: Subject to any disclaimer, the term of this patent is extended or adjusted under 35 U.S.C. 154(b) by 233 days.

(21) Appl. No.: 15/939,079

(22) Filed: Mar. 28, 2018

(65) Prior Publication Data
US 2018/0279712 A1  Oct. 4, 2018

Related U.S. Application Data

(60) Provisional application No. 62/478,910, filed on Mar. 30, 2017.

(51) Int. Cl.

| | |
|---|---|
| B32B 37/00 | (2006.01) |
| A42C 1/00 | (2006.01) |
| D06H 5/00 | (2006.01) |
| A42B 1/06 | (2006.01) |
| A42C 5/02 | (2006.01) |
| B29D 99/00 | (2010.01) |
| B29L 31/48 | (2006.01) |
| B29C 65/50 | (2006.01) |
| B29C 65/48 | (2006.01) |
| B29C 65/08 | (2006.01) |
| B29C 65/00 | (2006.01) |

(52) U.S. Cl.
CPC .............. *A42C 1/00* (2013.01); *A42B 1/062* (2013.01); *A42C 5/02* (2013.01); *D06H 5/00* (2013.01); *B29C 65/08* (2013.01); *B29C 65/4815* (2013.01); *B29C 65/50* (2013.01); *B29C 66/4326* (2013.01); *B29C 66/729* (2013.01); *B29D 99/0064* (2013.01); *B29L 2031/4814* (2013.01)

(58) Field of Classification Search
USPC ........................................................ 156/73.1
See application file for complete search history.

(56) References Cited

U.S. PATENT DOCUMENTS

| | | | |
|---|---|---|---|
| 7,754,037 B2 * | 7/2010 | Wang .................... | B29C 66/301 156/73.1 |
| 8,151,855 B2 * | 4/2012 | Liao ......................... | A42C 1/00 156/250 |

* cited by examiner

*Primary Examiner* — James D Sells
(74) *Attorney, Agent, or Firm* — Patshegen IP LLC; Moshe Pinchas

(57) ABSTRACT

Woven hats and methods for manufacturing woven hats by using an ultrasonic sewing technology without a sewing thread are disclosed. One illustrative method comprises steps such as: cutting a raw material of a hat crown into a plurality of pieces, then bonding such material in pairs using an ultrasonic sewing machine, applying to seam areas a hot-pressing bonding technology of heat-seal adhesive tape, and/or otherwise completing the manufacturing of the hat crown; manufacturing a visor by using a high-frequency hot-pressing technology; manufacturing a sweatband by using a one-time hot-pressing technology; bonding the hat crown, the visor, and the sweatband with an ultrasonic sewing machine; and fixing a rear fastener or a tail belt through rivets. The disclosed technology makes it easier to realize intelligent and automatic reformation of the manufacturing line.

11 Claims, 3 Drawing Sheets

WOVEN HAT AND METHOD FOR MANUFACTURING WOVEN HAT BY USING ULTRASONIC SEWING TECHNOLOGY WITHOUT SEWING THREAD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

The present application claims priority to U.S. Provisional Patent Application No. 62/478,910, filed on Mar. 30, 2017, entitled "A Method for Producing Non-thread Sewing Woven Cap by Using Ultrasonic Jointing Technology", the entire contents of which are incorporated herein by reference.

BACKGROUND

Field

The disclosed technology relates to methods for making hats, and in particular to a woven hat and a method for manufacturing a woven hat by using an ultrasonic sewing technology without a sewing thread.

Description of the Related Art

Hats belong to a kind of costume worn on heads. The existing woven hats are sewed by stitching, which involves a complicated machining process and can hardly achieve an automated operation.

SUMMARY OF VARIOUS ASPECTS

In order to solve the above problems, the disclosed technology provides a woven hat, and also provides a method for manufacturing a woven hat by using an ultrasonic sewing technology without a sewing thread.

The disclosed technology provides a method for manufacturing a woven hat by using an ultrasonic sewing technology without a sewing thread, which, according to some embodiments herein, may be characterized as comprising operating steps, such as:

Step 1: cutting a raw material of a hat crown into a plurality of pieces, then bonding in pairs using an ultrasonic sewing machine, and applying to seam allowance a hot-pressing bonding technology of heat-seal adhesive tape, completing the manufacturing of the hat crown;

Step 2: manufacturing a visor by using a high-frequency hot-pressing technology;

Step 3: manufacturing a sweatband by using a one-time hot-pressing technology;

Step 4: bonding the hat crown, the visor, and the sweatband with an ultrasonic sewing machine; and Step 5: fixing a rear fastener or a tail belt (a fastener, e.g. Velcro, etc., provided at a rear portion of a hat for slightly adjusting the hat size according to different head circumferences) through a rivet.

In one implementation consistent with such embodiments, the cut pieces that constitute the hat crown include two cut center-front-panel pieces and two cut rear-panel pieces.

In one implementation consistent with such embodiments, the two cut center-front-panel pieces are in the same shape and bonded to each other to form a combined center-front pane.

Further, the two cut rear-panel pieces may be in the same shape and bonded to each other to form a combined rear panel.

Additionally, the combined center-front panel and the combined rear panel may be connected with each other to form a hood-shaped hat crown.

In one implementation consistent with such embodiments, a LOGO module of the woven hat is provided on an outer surface of the combined center-front panel by 3D printing or embroidery.

In one implementation consistent with such embodiments, the visor is in a crescent shape, the hat crown is hood-shaped, and a concave edge of the visor and a lower edge of the combined center-front panel of the hat crown are attached to each other and are bonded together by hot-pressing.

In one implementation consistent with such embodiments, the step of manufacturing the visor in the Step 2 comprises adhering a cut visor piece to each of an upper surface and a lower surface of a crescent-shaped hard visor lining.

The disclosed technology also provides a method for manufacturing a woven hat by using an ultrasonic sewing technology without a sewing thread, which, in certain embodiments, may comprise the following steps:

Step 1, which is a material preparation step: preparing a hard visor lining and cutting the hard visor lining to obtain two cut center-front-panel pieces, two cut rear-panel pieces, and two cut visor pieces;

Step 2: bonding the two cut center-front panel pieces using an ultrasonic sewing machine, and then applying to a bonding seam a hot-pressing bonding technology of heat-seal adhesive tape to form an arc-shaped combined center-front panel; bonding the two cut rear-panel pieces using the ultrasonic sewing machine, and then applying to a bonding seam the hot-pressing bonding technology of heat-seal adhesive tape to form an arc-shaped combined rear panel; and then bonding two side edges of the combined rear panel to two side edges of the combined center-front panel respectively, and applying to bonding seams the hot-pressing bonding technology of heat-seal adhesive tape, so as to complete the manufacturing of the hat crown;

Step 3: bonding a cut visor piece to each of two surfaces of the hard visor lining by using hot-melt-glue hot-pressing technology, to form a visor; and Step 4: bonding the hat crown to the visor by using the ultrasonic sewing machine, wherein the process of jointing between the visor and the hat crown is carried out by the hot-melt-glue hot-pressing technology.

In one implementation consistent with such embodiments, a quarter-circular notch is provided at each of the two cut rear-panel pieces, so that a semicircular notch is formed at a lower edge of the combined rear panel formed by connecting the two cut rear-panel pieces; the two cut rear-panel pieces are connected at the semicircular notch by a tail belt formed of a stretchable belt, so that the hat crown can be elastically enlarged or reduced at its lower edge to accommodate to different sized heads.

In one implementation consistent with such embodiments, the two cut center-front-panel pieces obtained by cutting are in the same shape, and connected in such a way that the two cut center-front-panel pieces are symmetrical about a joint between them, to form the combined center-front panel.

In one implementation consistent with such embodiments, the two cut rear-panel pieces obtained by cutting are in the same shape, and connected in such a way that the two cut rear-panel pieces are symmetrical about a joint between them, e.g., to form the combined rear panel.

In one implementation consistent with such embodiments, a LOGO module of the woven hat is provided on an outer surface of the combined center-front panel by 3D printing or embroidery.

The disclosed technology also provides a woven hat, comprising a hat crown and a visor, wherein the hat crown comprises a combined center-front panel and a combined rear panel.

In certain implementations, two side edges of the combined center-front panel may be correspondingly bonded to and connected with two side edges of the combined rear panel to form the hood-shaped hat crown, and a bottom arc edge of the combined center-front panel and a bottom arc edge of the combined rear panel cooperate with each other to form a closed circle.

According to some aspects, the combined center-front panel may be a spatial arc panel formed by bonding and connecting two cut center-front-panel pieces at a first bonding seam; and the combined rear panel is a spatial arc panel formed by bonding and connecting two cut rear-panel pieces at a second bonding seam.

Further, a concave edge of the hat crown and the bottom arc edge of the combined center-front panel may coincide with each other and be connected together.

In one implementation consistent with such embodiments, a rear portion of each of the cut rear-panel pieces is provided with a quarter-circular notch, so that a semicircular notch is formed a rear portion of the combined rear panel formed by connecting the two cut rear-panel pieces.

According to some implementations, here, the two cut rear-panel pieces are connected with each other at their notches by a tail belt which is elastically stretchable in a length direction, so that the circumference at a lower edge of the hat crown can be elastically enlarged or reduced to accommodate to different sized heads.

In one implementation consistent with such embodiments, the tail belt is riveted to the cut rear-panel pieces by rivets.

In one implementation consistent with such embodiments, a lower edge of an inner surface of the hat crown is covered by a sweatband configured for absorbing perspired sweat.

In one implementation consistent with such embodiments, a LOGO module is provided at a middle position of a forward-facing outer surface of the combined center-front panel.

In one implementation consistent with such embodiments, the two cut center-front-panel pieces are in the same shape, and connected in such a way that the two cut center-front-panel pieces are symmetrical about the first bonding seam to form the combined center-front panel.

In one implementation consistent with such embodiments, the two cut rear-panel pieces are in the same shape, and connected in such a way that the two cut rear-panel pieces are symmetrical about the second bonding seam to form the combined rear panel.

Overall, advantages of the woven hat and the method for manufacturing a woven hat by using an ultrasonic sewing technology without a sewing thread according to various implementations of the disclosed technology may include one or more of the following: using the ultrasonic sewing and bonding to realize no seam allowance, which replaces the conventional sewing by stitching, wherein a hot-pressing bonding technology of heat-seal adhesive tape is applied to the seam allowance, which replaces the conventional double-needle covering process using a strip of cloth; using the high-frequency hot-pressing technology, which replaces the conventional stitching (thread arranging) process; using the one-time hot-pressing technology, which replaces the conventional folder stitching technology; and/or using the rivet to fix the rear fastener or the tail belt, which replaces the conventional technology of repeatedly sewing the rear fastener three times. The disclosed technology makes it easier to realize intelligent and automatic reformation of the manufacturing line. In addition, the hat manufactured by the present method has the waterproof function.

BRIEF DESCRIPTION OF THE DRAWINGS

To help with illustrating aspects of the present innovations, such as technical solutions of embodiments of the disclosed technology more clearly, various drawings consistent with some embodiments are introduced briefly below. It is to be understood that the drawings below are merely illustrative of some embodiments of the disclosed technology, and therefore should not to be considered as limiting the scope of the disclosure. It would be understood by those skilled in the art that other relevant aspects, features and/or depictions can also be obtained from the present disclosure without undue effort.

Figure 1:
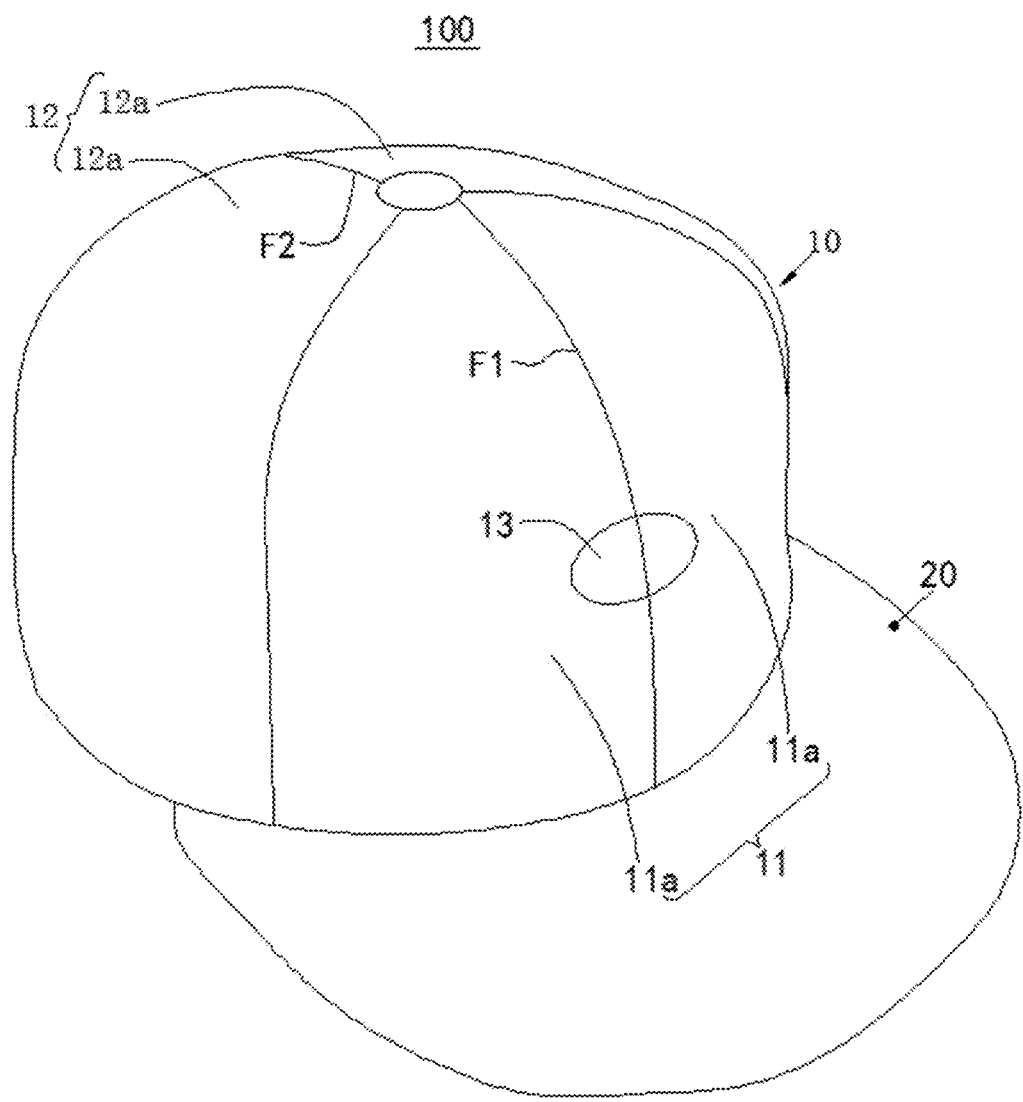
FIG. 1 is a view showing a woven hat consistent with one or more implementations of the disclosed technology from a first view angle.

In the drawings these reference numerals correspond to the following components: 100—woven hat; 10—hat crown; 20—visor; 11—combined center-front panel; 11*a*—cut center-front-panel piece; 12—combined rear panel; 12*a*—cut rear-panel piece; K1—semicircular notch; 30—tail belt; 13—LOGO module; 21—cut visor piece; 22—hard visor lining; F1—first bonding seam; F2—second bonding seam; D1—rivet.

DETAILED DESCRIPTION OF ILLUSTRATIVE IMPLEMENTATIONS

Embodiments of the disclosed technology are described below with reference to drawings and some implementations.

Embodiments

Figure 2:
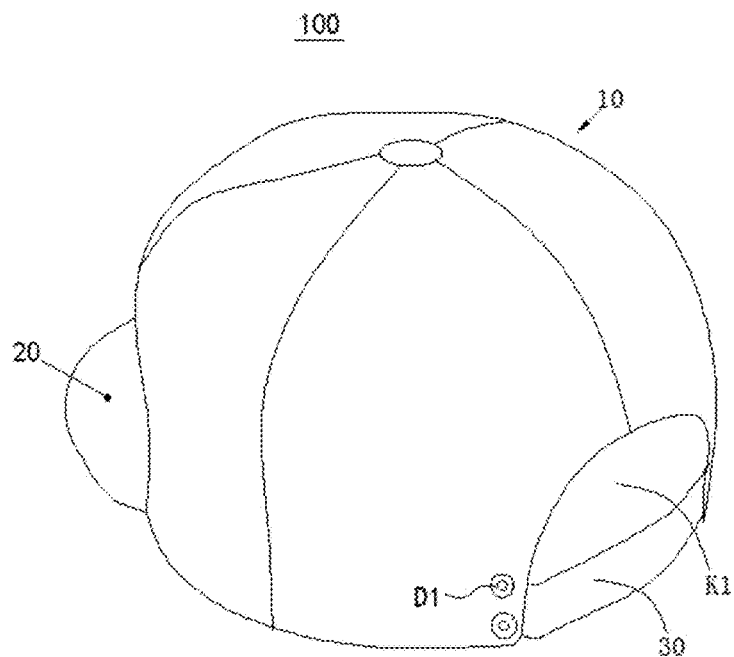
FIG. 2 is a view showing a woven hat consistent with one or more implementations of the disclosed technology from a second view angle.
Figure 3:
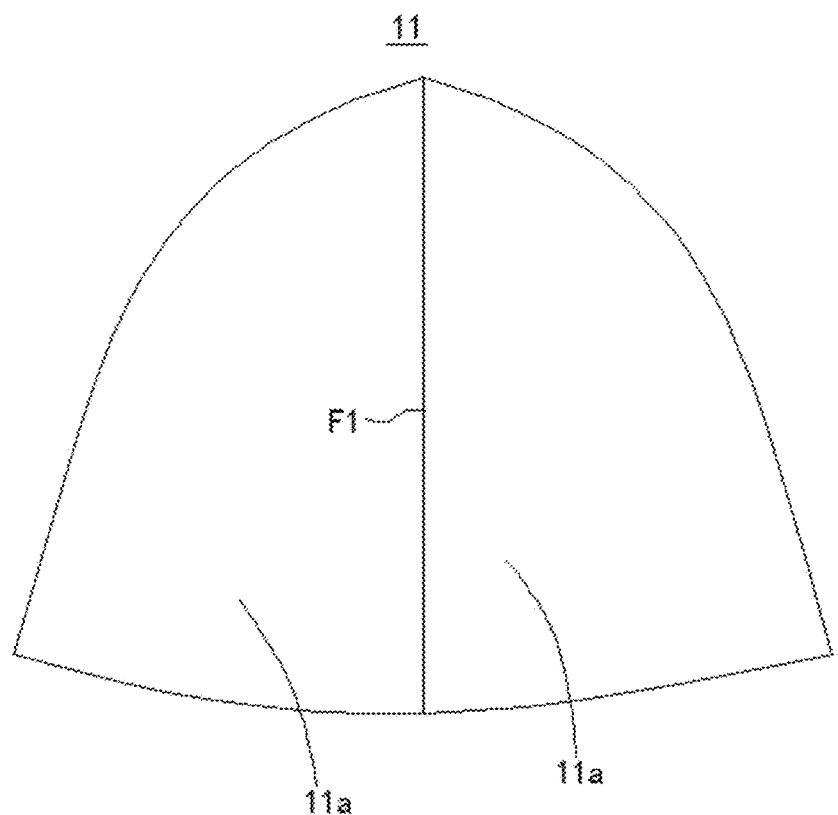
FIG. 3 is a structural view of a combined center-front panel, consistent with one or more implementations herein.
Figure 4:
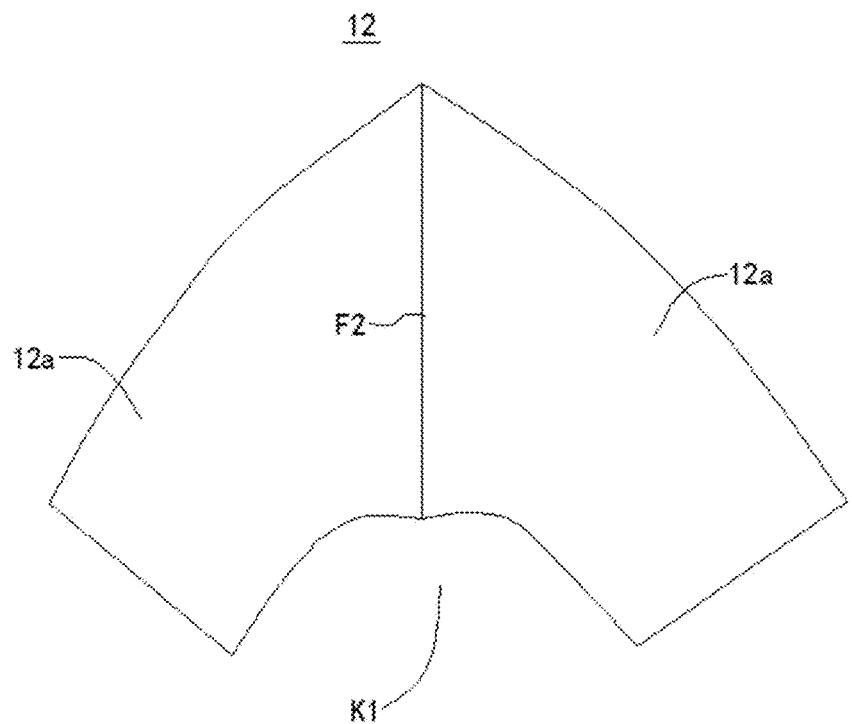
FIG. 4 is a structural view of a combined rear panel, consistent with one or more implementations herein.
Figure 5:
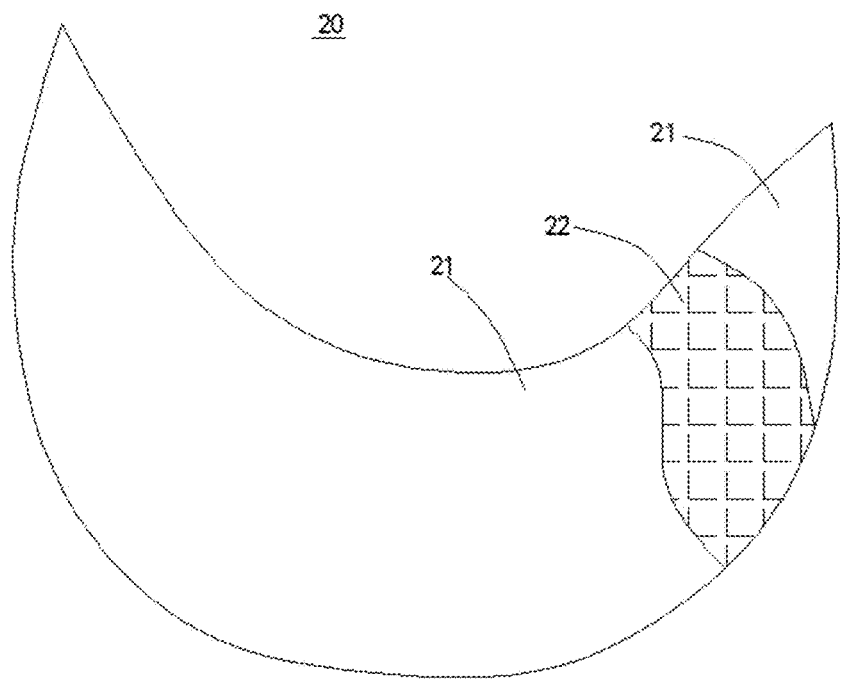
FIG. 5 is a structural view of a visor, consistent with one or more implementations herein.

Referring to FIG. 1 to FIG. 5, a woven hat 100 consistent with certain embodiments may comprise two parts which are a hat crown 10 and a visor 20. Here, the hat crown 10 is in the shape of a hood for covering the head; and the visor 20 is in a crescent shape as a whole, and has a concave edge connected to a lower edge of the hat crown for sunshade and other purposes.

The hat crown 10 in one implementation may comprise a combined center-front panel 11 and a combined rear panel 12; two side edges of the combined center-front panel 11 are correspondingly bonded to and connected with two side edges of the combined rear panel 12 to form the hood-shaped hat crown 10, and a bottom arc edge of the combined center-front panel 11 and a bottom arc edge of the combined rear panel 12 cooperate with each other to form a closed circle; the combined center-front panel 11 is a spatial arc panel formed by bonding and connecting two cut center-front-panel pieces 11a at a first bonding seam F1; the combined rear panel 12 is a spatial arc panel formed by bonding and connecting two cut rear-panel pieces 12a at a second bonding seam F2; and a concave edge of the hat crown 10 and the bottom arc edge of the combined center-front panel 11 coincide with each other and are connected together.

In one implementation consistent with such embodiments, a rear portion of each of the cut rear-panel pieces 12a is provided with a quarter-circular notch, so that a semicircular notch K1 is formed at a rear portion of the combined rear panel 12 formed by connecting the two cut rear-panel pieces 12a; the two cut rear-panel pieces are connected with each other at their notches by a tail belt 30 which is elastically stretchable in a length direction, so that the circumference at the lower edge of the hat crown 10 can be elastically enlarged or reduced to accommodate to different sized heads. In the above, the tail belt 30 is riveted to the cut rear-panel pieces 12a by rivets D1. Optionally, a lower edge of an inner surface of the hat crown 10 is covered by a sweatband for absorbing perspired sweat. In certain implementations, a LOGO module 13 may be provided at a middle position of a forward-facing outer surface of the combined center-front panel 11.

In one implementation consistent with such embodiments, the two cut center-front-panel pieces 11a are in the same shape, and connected in such a way that the two cut center-front-panel pieces are symmetrical about the first bonding seam F1 to form the combined center-front panel 11. The two cut rear-panel pieces 12a are in the same shape, and connected in such a way that the two cut rear-panel pieces are symmetrical about the second bonding seam F2 to form the combined rear panel 12.

In some implementations, optionally, for the woven hat 100 made of cut pieces of pure cotton fabric or cut pieces of pure wool fabric, cut pieces are connected by a gluing technology; for the woven hat 100 made of cut pieces of fabrics other than the pure cotton fabric and the pure wool fabric, the cut pieces are jointed by using an ultrasonic or gluing technology; and the hat crown and the visor are jointed by using hot melt glue.

The disclosed technology also provides methods for manufacturing a woven hat by using an ultrasonic sewing technology without a sewing thread, one such exemplary method comprises operating steps as follows:

Step 1: cutting a raw material of a hat crown 10 into a plurality of pieces, then bonding in pairs using an ultrasonic sewing machine, and applying to seam allowance a hot-pressing bonding technology of heat-seal adhesive tape, completing the manufacturing of the hat crown 10;

Step 2: manufacturing a visor 20 by using a high-frequency hot-pressing technology;

Step 3: manufacturing a sweatband by using a one-time hot-pressing technology;

Step 4: bonding the hat crown 10, the visor 20, and the sweatband with an ultrasonic sewing machine, wherein the process of jointing between the visor 20 and the hat crown 10 can be carried out by using hot-melt-glue hot-pressing technology; and Step 5: fixing a rear fastener or a tail belt 30 through rivets D1.

In one implementation consistent with such embodiments, the cut pieces that constitute the hat crown 10 include two cut center-front-panel pieces 11a and two cut rear-panel pieces 12a. The two cut center-front-panel pieces 11a are in the same shape and bonded to each other to form a combined center-front panel 11; the two cut rear-panel pieces 12a are in the same shape and bonded to each other to form a combined rear panel 12; and the combined center-front panel 11 and the combined rear panel 12 are connected with each other to form the hood-shaped hat crown 10.

In some implementations, a LOGO module 13 of the woven hat 100 may be provided on an outer surface of the combined center-front panel 11 by 3D printing or embroidery. The visor 20 is in a crescent shape, the hat crown 10 is hood-shaped, and a concave edge of the visor 20 and a lower edge of the combined center-front panel 11 of the hat crown 10 are attached to each other and are bonded together by hot-pressing. The step of manufacturing the visor 20 in Step 2 comprises adhering a cut visor piece 21 to each of an upper surface and a lower surface of a crescent-shaped hard visor lining 22.

The disclosed technology also provides methods for manufacturing a woven hat by using an ultrasonic sewing technology without a sewing thread, where one such exemplary method may comprise the following steps:

Step 1, which is a material preparation step: preparing a hard visor lining 22 and cutting the hard visor lining 22 to obtain two cut center-front-panel pieces 11a, two cut rear-panel pieces 12a, and two cut visor pieces 21;

Step 2: bonding the two cut center-front-panel pieces 11a using an ultrasonic sewing machine, and then applying to a bonding seam a hot-pressing bonding technology of heat-seal adhesive tape to form an arc-shaped combined center-front panel 11; bonding the two cut rear-panel pieces 12a using the ultrasonic sewing machine, and then applying to a bonding seam the hot-pressing bonding technology of heat-seal adhesive tape to form an arc-shaped combined rear panel 12; and then bonding two side edges of the combined rear panel 12 to two side edges of the combined center-front panel 11 respectively, and applying to bonding seams the hot-pressing bonding technology of heat-seal adhesive tape, so as to complete the manufacturing of the hat crown 10;

Step 3: bonding a cut visor piece 21 to each of two surfaces of the hard visor lining 22 by using hot-melt-glue hot-pressing technology, to form a visor 20; and Step 4: bonding the hat crown 10 to the visor 20 by using the ultrasonic sewing machine, wherein the process of jointing between the visor and the hat crown is carried out by the hot-melt-glue hot-pressing technology.

In one implementation consistent with such embodiments, a quarter-circular notch is provided at each of the two cut rear-panel pieces 12a, so that a semicircular notch K1 is formed at a lower edge of the combined rear panel 12 formed by connecting the two cut rear-panel pieces; the two cut rear-panel pieces 12a are connected at the semicircular notch K1 by a tail belt 30 formed of a stretchable belt, so that the hat crown 10 can be elastically enlarged or reduced at its lower edge to accommodate to different sized heads. The two cut center-front-panel pieces 11a obtained by cutting are in the same shape, and connected in such a way that the two cut center-front-panel pieces are symmetrical about a joint between them, to form the combined center-front panel 11. The two cut rear-panel pieces 12a obtained by cutting are in the same shape, and connected in such a way that the two cut rear-panel pieces are symmetrical about a joint between them, to form the combined rear panel 12. In some implementations, a LOGO module 13 of the woven hat 100 may be provided on an outer surface of the combined center-front panel 11 by 3D printing or embroidery.

In some such embodiments, optionally, for the woven hat 100 made of cut pieces of pure cotton fabric or cut pieces of pure wool fabric, cut pieces are connected by a gluing technology; for the woven hat 100 made of cut pieces of fabrics other than the pure cotton fabric and the pure wool fabric, the cut pieces are jointed by using an ultrasonic or gluing technology. The hat crown and the visor are jointed by using hot melt glue.

The foregoing disclosure is merely illustrative of several specific and exemplary implementations of the disclosed technology. However, the disclosed technology is not limited thereto. Any variations that can be conceived by those skilled in the art should fall within the scope of protection of the disclosed innovations.

Industrial Applicability

The method for manufacturing a woven hat by using an ultrasonic sewing technology without a sewing thread of the disclosed technology makes it easier to realize intelligent and automatic reformation of a manufacturing line and is suitable for faster, less complex and/or otherwise improved industrial applications.

What is claimed is:

1. A method for manufacturing a woven hat by using an ultrasonic sewing technology without a sewing thread, comprising operating steps as follows:
    Step 1: cutting a raw material of a hat crown into a plurality of pieces, then bonding in pairs using an ultrasonic sewing machine, and applying to a seam allowance a hot-pressing bonding technology of heat-seal adhesive tape, completing manufacturing of the hat crown;
    Step 2: manufacturing a visor by using a high-frequency hot-pressing technology;
    Step 3: manufacturing a sweatband by using a one-time hot-pressing technology;
    Step 4: bonding the hat crown, the visor, and the sweatband with the ultrasonic sewing machine; and
    Step 5: fixing a rear fastener or a tail belt through a rivet.

2. The method for manufacturing a woven hat by using an ultrasonic sewing technology without a sewing thread according to claim 1, wherein the cut pieces that constitute the hat crown comprises two cut center-front-panel pieces and two cut rear-panel pieces.

3. The method for manufacturing a woven hat by using an ultrasonic sewing technology without a sewing thread according to claim 2, wherein the two cut center-front-panel pieces are in a same shape and bonded to each other to form a combined center-front panel;
    the two cut rear-panel pieces are in a same shape and bonded to each other to form a combined rear panel; and
    the combined center-front panel and the combined rear panel are connected with each other to form the hat crown which is hood-shaped.

4. The method for manufacturing a woven hat by using an ultrasonic sewing technology without a sewing thread according to claim 3, wherein a LOGO module of the woven hat is provided on an outer surface of the combined center-front panel by 3D printing or embroidery.

5. The method for manufacturing a woven hat by using an ultrasonic sewing technology without a sewing thread according to claim 3, wherein the visor is in a crescent shape, the hat crown is hood-shaped, and a concave edge of the visor and a lower edge of the combined center-front panel of the hat crown are attached to each other and are bonded together by hot-pressing.

6. The method for manufacturing a woven hat by using an ultrasonic sewing technology without a sewing thread according to claim 1, wherein for the woven hat made of cut pieces of pure cotton fabric or cut pieces of pure wool fabric, cut pieces are connected by a gluing technology;
    for the woven hat made of cut pieces of fabrics other than the pure cotton fabric and the pure wool fabric, the cut pieces are jointed by using an ultrasonic or gluing technology; and
    the hat crown and the visor are jointed by using hot melt glue.

7. A method for manufacturing a woven hat by using an ultrasonic sewing technology without a sewing thread, comprising:
    Step 1: preparing a hard visor lining, and cutting the hard visor lining to obtain two cut center-front-panel pieces, two cut rear-panel pieces, and two cut visor pieces;
    Step 2: bonding the two cut center-front-panel pieces using an ultrasonic sewing machine, and then applying to a bonding seam a hot-pressing bonding technology of heat-seal adhesive tape to form an arc-shaped combined center-front panel; bonding the two cut rear-panel pieces using the ultrasonic sewing machine, and then applying to a bonding seam the hot-pressing bonding technology of heat-seal adhesive tape to form an arc-shaped combined rear panel; and then bonding two side edges of the combined rear panel to two side edges of the combined center-front panel respectively, and applying to bonding seams the hot-pressing bonding technology of heat-seal adhesive tape, so as to complete manufacturing of a hat crown;
    Step 3: bonding a cut visor piece to each of two surfaces of the hard visor lining by using a hot-melt-glue hot-pressing technology, to form a visor; and
    Step 4: bonding the hat crown and the visor by using the ultrasonic sewing machine, wherein a process of jointing between the visor and the hat crown is carried out by the hot-melt-glue hot-pressing technology.

8. The method for manufacturing a woven hat by using an ultrasonic sewing technology without a sewing thread according to claim 7, wherein a quarter-circular notch is provided at each of the two cut rear-panel pieces, so that a semicircular notch is formed at a lower edge of the combined rear panel formed by connecting the two cut rear-panel pieces; and the two cut rear-panel pieces are connected at the semicircular notch by a tail belt formed of a stretchable belt, so that the hat crown can be elastically enlarged or reduced at a lower edge of the hat crown to accommodate to different sized heads.

9. The method for manufacturing a woven hat by using an ultrasonic sewing technology without a sewing thread according to claim 7, wherein the two cut center-front-panel pieces obtained by cutting are in a same shape, and connected in such a way that the two cut center-front-panel pieces are symmetrical about a joint therebetween, to form the combined center-front panel.

10. The method for manufacturing a woven hat by using an ultrasonic sewing technology without a sewing thread according to claim 7, wherein the two cut rear-panel pieces obtained by cutting are in a same shape, and connected in such a way that the two cut rear-panel pieces are symmetrical about a joint therebetween, to form the combined rear panel.

11. The method for manufacturing a woven hat by using an ultrasonic sewing technology without a sewing thread according to claim 7, wherein a LOGO module of the woven hat is provided on an outer surface of the combined center-front panel by 3D printing or embroidery.

* * * * *